(12) United States Patent
Little

(10) Patent No.: US 7,252,453 B1
(45) Date of Patent: Aug. 7, 2007

(54) ROBOT ARM COUPLING APPARATUS

(75) Inventor: Robert Little, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 838 days.

(21) Appl. No.: 10/157,581

(22) Filed: May 29, 2002

(51) Int. Cl.
*F16D 1/00* (2006.01)

(52) U.S. Cl. .................................. 403/322.2

(58) Field of Classification Search ........... 403/321, 403/322.1, 322.2, 322.3, 328, 326, 327, 329
See application file for complete search history.

(56) References Cited

U.S. PATENT DOCUMENTS 4,614,470 A * 9/1986 Sato et al. ........... 403/322.3 X
4,636,135 A * 1/1987 Bancon ................ 403/322.3 X
4,696,524 A * 9/1987 Cloyd ........................ 439/197
5,211,501 A * 5/1993 Nakamura et al. ........ 403/322.3

* cited by examiner

*Primary Examiner*—Chong H. Kim
(74) *Attorney, Agent, or Firm*—Coats & Bennett, P.L.L.C.

(57) ABSTRACT

A robotic tool coupling system includes a first connecting unit including a piston movable along a longitudinal axis. The piston includes a multifaceted contact surface comprising a tapered locking surface; an initial actuating surface having an angle with respect to the axis not greater than the angle of the tapered locking surface; and a failsafe surface interposed between the tapered locking surface and the initial actuating surface. The system includes a second connecting unit having a plurality of rolling members disposed in a retention chamber including at least one angled surface operative to lock the first and second units together when the rolling members are forced against the angled surfaces by the tapered locking surface. The piston contact surface may additionally include a step surface, generally normal to the longitudinal axis, and a retention surface generally parallel to the axis.

33 Claims, 4 Drawing Sheets

ROBOT ARM COUPLING APPARATUS

BACKGROUND OF THE INVENTION

The present invention relates generally to the field of robotics and specifically to robotic tool coupling device.

Robots are widely utilized in industrial assembly line applications to perform repetitive tasks very precisely without the need for human operation, interaction, or supervision. For example, robots are commonly used in the automotive industry to perform a number of tasks such as material handling and spot-welding of automobile bodies.

To amortize the considerable cost of an industrial robot over a variety of tasks, the robot arm is typically separate from a diverse array of tools, which are removably attached to the end of the robot arm. To facilitate this plurality of tools, each robot arm typically terminates in a coupling device, referred to as a "master" device or master plate. A corresponding "tool" device or tool plate is connected to each tool that may be attached to the robot arm. A coupling mechanism positively locks the master and tool plates together for the duration of the use of the tool on the robot arm, and releases the tool from the robot arm upon completion of the tool's task(s). The coupling mechanism may additionally provide for the transfer of services from the robot arm to the tool, such as electrical power, pneumatic fluid, or the like.

The use of rolling members, urged by a piston against an inclined surface, to lock the master and tool plates together is well known in the art. For example, U.S. Pat. No. 4,696,524 discloses a plurality of ball members contained within the tool plate, and circumferentially arranged around a central axis. Extending from the master plate, along this axis, is a piston member operative to contact the ball members and urge them outwardly. The ball members contact a surface disposed at an angle such that outward force induced on the ball members by the piston generates an upward force component that presses the angled surface, and thus the entire tool plate, against the master plate.

U.S. Pat. No. 5,211,501 discloses a substantially similar piston and ball member arrangement, with an improved piston/ball member contact surface. This patent discloses a multifaceted contact surface comprising an initial tapered contact surface for first contacting the ball members and moving them outward and into contact with an angled surface. A flat failsafe surface is adjacent the initial tapered surface. A final tapered surface, at an angle with respect to the axis of less than that of the initial actuating surface, is adjacent the failsafe surface. The final tapered surface presses the ball members into the angled surface(s), and locks the tool plate to the master plate.

SUMMARY OF THE INVENTION

The present invention relates to a robotic tool connecting system. The system includes a first robotic tool connecting unit including a piston selectively movable along a longitudinal axis. The piston including a multifaceted contact surface comprising a tapered locking surface; an initial actuating surface having an angle with respect to the axis not greater than the angle of the tapered locking surface; and a failsafe surface interposed between the tapered locking surface and the initial actuating surface. The system also includes a second robotic tool connecting unit having a plurality of rolling members. The rolling members are disposed in a retention chamber including at least one angled surface operative to lock the first and second units together when the rolling members are forced against the angled surfaces by the tapered locking surface.

The piston multifaceted contact surface may additionally include a step surface, generally normal to the piston's longitudinal axis, and abutting the initial actuating surface. The step surface forms a corner or edge with the initial actuating surface, which corner is the initial point of contact between the piston and the rolling members. Abutting the step surface, inward of the initial actuating surface, may be provided a retention surface for retaining the rolling members within the retention chamber prior to contact with the other piston contact surfaces. The retention surface may be generally parallel to the piston axis.

BRIEF DESCRIPTION OF DRAWINGS

FIGS. 3A-2D are sectional detail views of the piston contact surface, a rolling member, and a corresponding angled surface, as the piston moves along its axis.

DETAILED DESCRIPTION OF THE INVENTION

Figure 1:
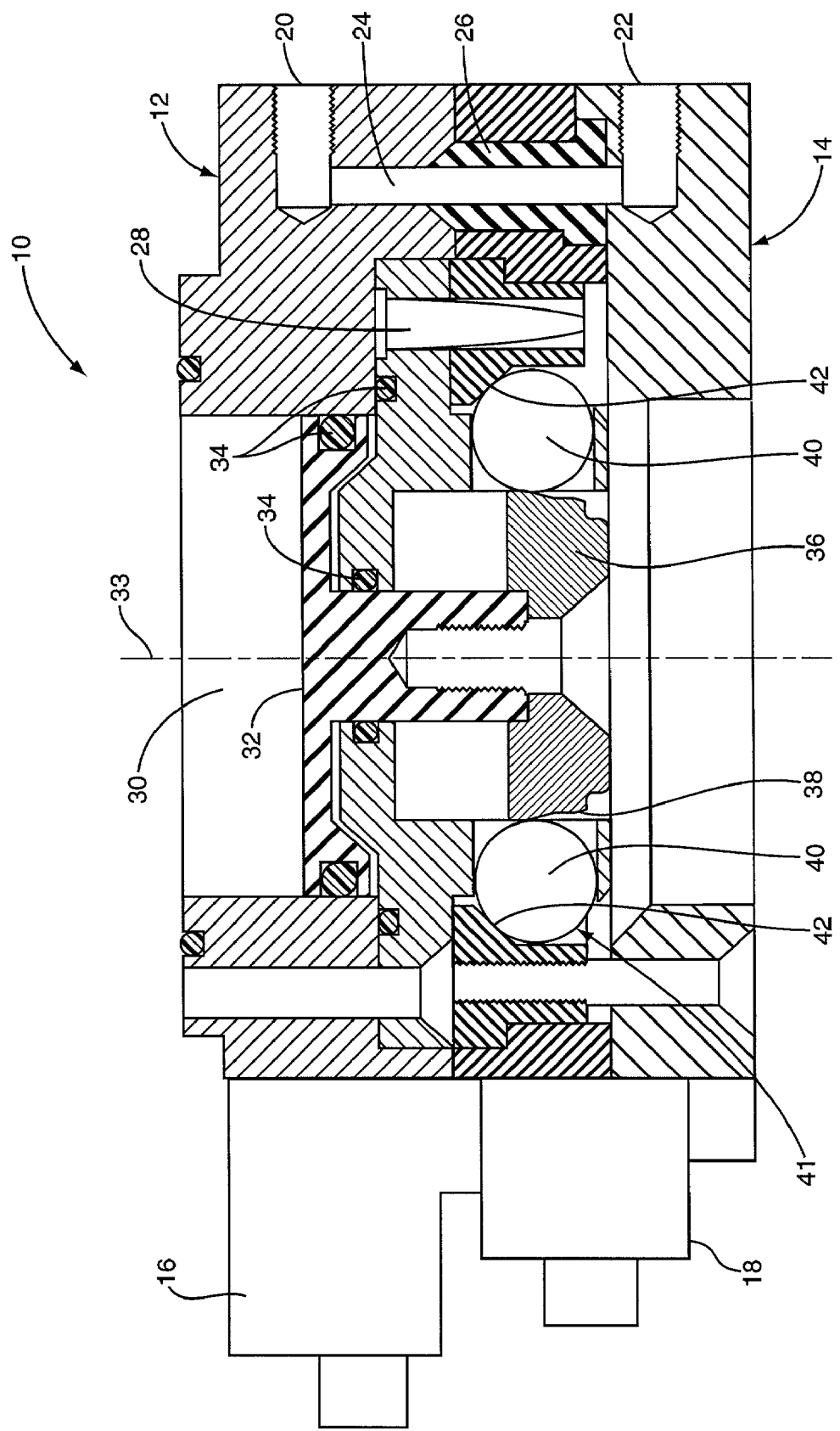
FIG. 1 is a sectional side view of the coupling apparatus of the present invention.

FIG. 1 depicts a representative sectional side view of a robot arm coupling mechanism according to the present invention. The coupling mechanism 10 of FIG. 1 is substantially similar in many respects to that disclosed in U.S. Pat. No. 5,211,501, which is incorporated by reference herein in its entirety.

The robot arm coupling mechanism 10 of FIG. 1 comprises a first coupling unit, or master plate 12, depicted in FIG. 1 in a locked or coupled relationship to a second coupling unit, or tool plate 14. Since, as described above, each robot arm typically includes a single master plate 12, and a plurality of tool plates 14, each coupled to a different tool, it is common to locate active components within the master plate 12, thus minimizing the cost of tool plates 14. However, one of skill in the art will recognize that the distribution of active and passive components within the master plate 12 and tool plate 14 may be reversed. Although the master plate 12 is typically connected to a robot arm, and the tool plate 14 is connected to a robotic tool, this orientation may be reversed in any given application, within the broad practice of the present invention as claimed herein.

In addition to physically coupling the master plate 12 and tool plate 14 together, so as to secure a tool to the end of a robot arm, the robotic coupling device 10 additionally facilitates the provision of various services to the attached tool. For example, master electrical contact 16, associated with the master plate 12, is placed in electrically conductive contact with tool electrical contact 18, associated with the tool plate 14. This provides for potentially large electrical currents, such as may be utilized for example by a welding tool, to be passed from an electrical source connected to the robot arm to the tool, upon the coupling together of the master plate 12 and the tool plate 14. This may obviate the need for a separate electrical supply to be connected to the tool. Similarly, pneumatic fluid may be transferred between the robot arm and an attached tool via the master pneumatic connector 20 and tool pneumatic connector 22, connected by pneumatic fluid passage 24. To ensure a pressure-tight seal along pneumatic fluid passage 24, a rubber boot 26 is disposed in the tool plate 14, which seals against the master plate 12 when the two are coupled together. Although not shown in FIG. 1, other services, such as for example, hydraulic fluid, cooling fluid, oil, data transfer, and the like may similarly be provided via appropriate mating transfer passageways or connections between the master plate 12 and the tool plate 14.

To ensure that service passageways such as pneumatic fluid passage 24 are aligned between the master plate 12 and the tool plate 14 when coupled together, one or more locator pins 28 may be associated with, e.g., the master plate 12, with a corresponding receiving hole or slot formed in the tool plate 14. Locator pins 28 should be placed in rotationally invariant positions around the master plate 12, as is well known in the art.

The physical coupling or locking together of master plate 12 and tool plate 14 is accomplished via actuation of piston 32 along its longitudinal axis 33, and the cooperative movement and force transfer of rolling members 40. A fluid chamber 30 is disposed within the master plate 12. Positioned within the fluid chamber 30 is a piston 32, pneumatically sealed against the body of the master plate 12 by O-rings 34. By forcing pneumatic fluid into and out of fluid chamber 30 (such as through pneumatic fluid inlets and outlets, not shown), the piston 32 is forced to translate or move along a longitudinal axis—the axis being generally vertical and centered as depicted in FIG. 1.

Connected to the piston 32 is a piston contact head 36, which includes a multi-faceted contact surface 38. As one of skill in the art will readily recognize, the multi-faceted contact surface 38 could be formed directly on the piston 32 as a unitary, integrated structure, or could be operatively coupled to or associated with the piston 32 in a variety of ways. The provision of the multi-faceted contact surface 38 on the removable piston contact head 36 is thus only one preferred embodiment, and the present invention is not limited to this configuration. In general, the piston 32 will be referred to herein as "having" a multi-faceted contact surface 38, without regard to the specific implementation details of how the two are coupled in any particular embodiment.

A plurality of rolling members 40 is disposed within a rolling member retention chamber 41 in the master plate 12. When the master plate 12 and tool plate 14 are brought together in the coupling position, an angled surface 42 connected to the tool plate 14 forms an outer wall of the rolling member retention chamber 41. The multi-faceted contact surface 38 (described in greater detail below) of the piston 32 interacts with rolling members 40 as the piston 32 is moved longitudinally along its axis, so as to urge rolling members 40 to roll outwardly within the rolling member retention chamber 41. As the rolling members 40 are urged outwardly from the axis of the piston 32 by contact with the multi-faceted contact surface 38, the rolling members 40 come into contact with the angled surface 42. The angled surface 42 is angled so as to generate a generally upwardly directed force in response to a radial force exerted thereon by the rolling member 40 (resulting from a radial force exerted on the rolling member 40 by a contact surface 38 of the piston 32). This upward force presses the tool plate 14 against the master plate 12, locking the two together. By maintaining positive axial force on the piston 32, the multi-faceted contact surface 38 maintains an outwardly-directed radial force on rolling members 40, which in turn maintains an upwardly-directed force on the angled surface 42, keeping the two plates positively locked together.

The multi-faceted contact surface 38 of the piston 32, and its interaction with rolling members 40 and angled surface 42, is described with reference to FIGS. 3A-3D. As disclosed in U.S. Pat. No. 5,211,501, the contact surface of the piston that initially actuates the rolling member outwardly (referred to therein as the "second tapered surface") serves two distinct functions. First, it secures the rolling member within the rolling member retention chamber 41 in the master plate 12, such as when the two plates are decoupled. Secondly, the surface urges the rolling member 40 outwardly as the piston is advanced along its longitudinal axis. According to the present invention, these two functions are separated.

Figure 2A:
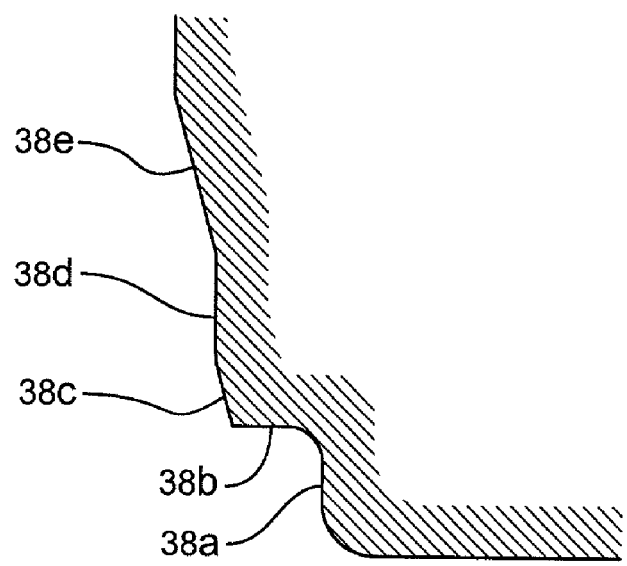
FIGS. 2A and 2B are enlarged sectional detail views of the piston contact surface according to two embodiments of the present invention.
Figure 3A:
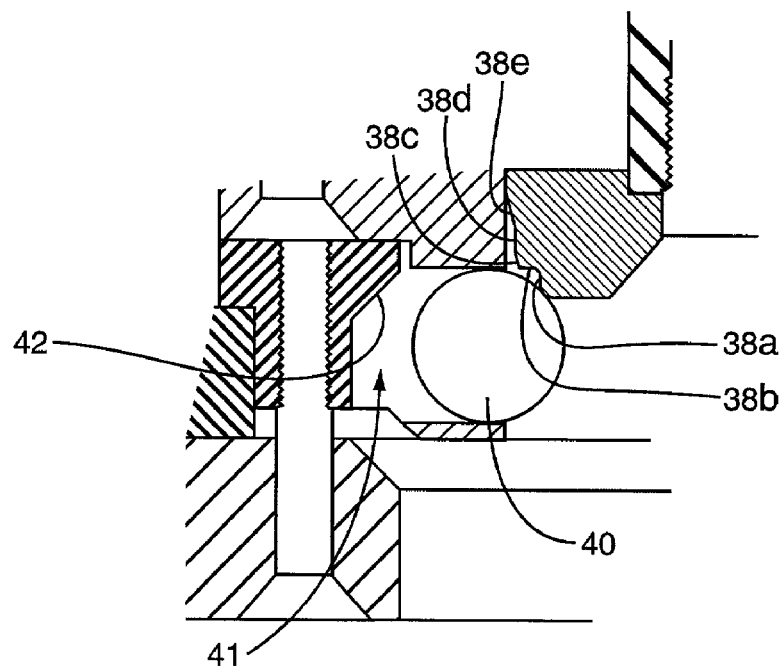

As depicted in FIG. 2A, the multi-faceted contact surface 38 may comprise a plurality of surfaces, specifically: retention surface 38a, step surface 38b, initial actuating surface 38c, failsafe surface 38d, and tapered locking surface 38e. Retention surface 38a is generally parallel to the longitudinal axis 33 of the piston 32, and located at an inwardly spaced radial position with respect thereto. The purpose of retention surface 38a is to retain the rolling member 40 within the rolling member retention chamber 41, as depicted in FIG. 3A. The size and location of the retention surface 38a is such that when the piston 32 is fully retracted (i.e., when the master plate 12 and tool plate 14 are decoupled), the retention surface 38a engages the rolling member 40 at the innermost extent of the rolling member's 40 movement within the retention chamber 41 to the degree necessary to prevent the rolling member 40 to roll or fall out of the retention chamber 41. The retention surface 38a is inapposite to the forced outward movement of rolling members 40, and any outward force induced on the rolling member 40 by the retention surface 38a is incidental.

Extending radially outward from the retention surface 38a is a step surface 38b, oriented generally normal or perpendicular to the longitudinal axis 33 of the piston 32. Step surface 38b terminates at its outward extent with initial actuating surface 38c. The initial actuating surface 38c may be outwardly tapered, as depicted in FIG. 2A. That is, the initial actuating surface 38c may be inclined with respect to the axis 33. Specifically, the initial actuating surface 38c may increase in distance from the axis 33 in a longitudinal direction away from the step surface 38b (and towards the failsafe surface 38d). The taper of the initial actuating surface 38c, if present, may for example fall within the range from about 0 to 30 degrees with respect to the axis 33 of the piston 32, more preferably within the range from about 5 to 30 degrees, still more preferably in the range from about 7 to 15 degrees, and most preferably about 11 degrees. The angle of the taper of the initial actuating surface 38c is less than or equal to the angle of tapered locking surface 38E.

Figure 2B:
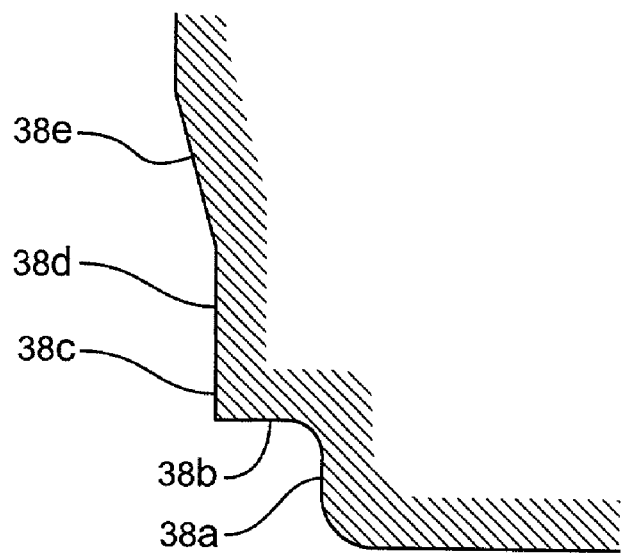

In one embodiment, as depicted in FIG. 2B, the initial actuating surface 38c may be parallel to the axis 33, i.e., with a taper of approximately 0 degrees, in which case it simply merges with the failsafe surface 38d. In either case, the initial point of contact between the piston 32 and the rolling member 40 that is operative to force the rolling member 40 to roll in an outward direction, is the edge or corner between step surface 38b and initial actuating surface 38c. In one embodiment, this edge or corner may be chamfered, or may be rounded, as well known in the art.

Figure 3B:
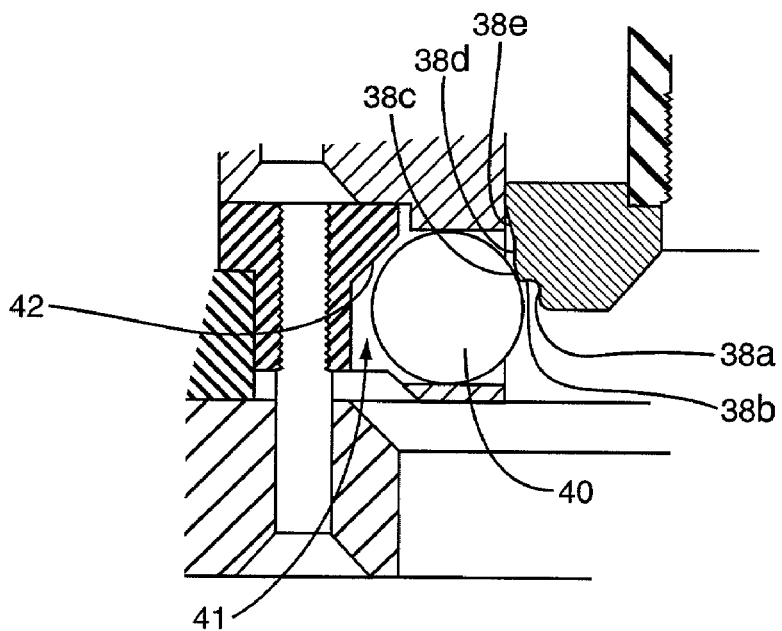

As depicted in FIG. 3B, the contact of this edge or corner (i.e., the edge between the step surface 38b and the initial actuating surface 38c) with the rolling member 40 forces the rolling member 40 to roll in a radially outward direction within the rolling member retention chamber 41, towards the angled surface 42. This outward movement of the rolling member 40 continues as the edge or corner progresses downwardly along the circumference of the rolling member 40, as the piston 32 moves in a downward direction. Note that in the case that initial actuating surface 38c is tapered, at some point (as depicted in FIG. 3B), the point of contact between the piston 32 and the rolling member 40 will transition from the corner or edge defining the abutment of step surface 38b with initial actuating surface 38c, to a point along the tapered initial actuating surface 38c.

Figure 3C:
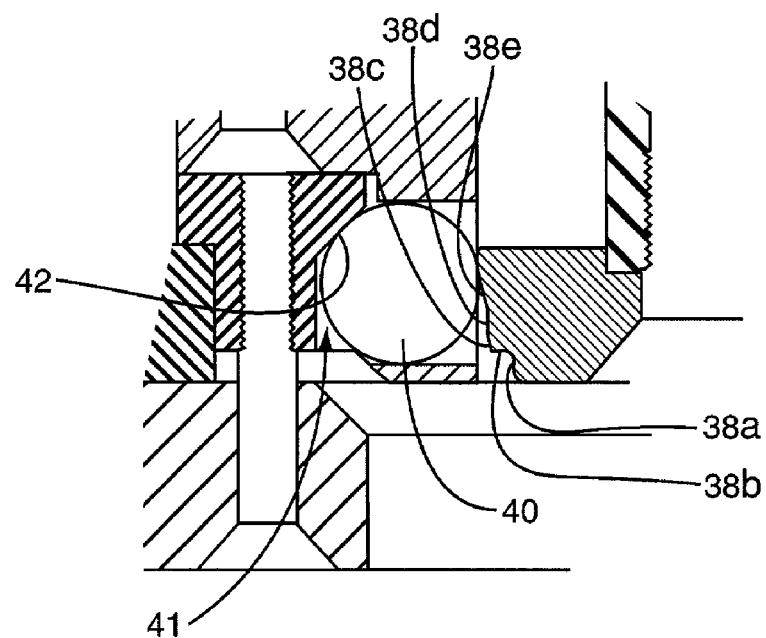

FIG. 3C depicts the final, or locked position of the piston 32. The piston 32 contacts the rolling member 40 along the tapered locking surface 38e. Due to the taper of the tapered locking surface 38e (the angle of which is greater than that of the initial actuating surface 38c), force exerted in a downward position by the piston 32 is translated into a generally horizontal, outwardly-oriented force on the rolling member 40. At this point, the rolling member 40 is in contact with the angled surface 42 at the outer extent of the rolling member retention chamber 41. The angle of the angled surface 42 is operative to translate the generally horizontal, outwardly-directed force exerted by rolling member 40 into a generally upwardly-directed force, that is operative to lock the tool plate 14 to the master plate 12. In this manner, the tool plate 14 is positively pressed against the master plate 12, so long as a downward force is maintained on the piston 32.

Figure 3D:
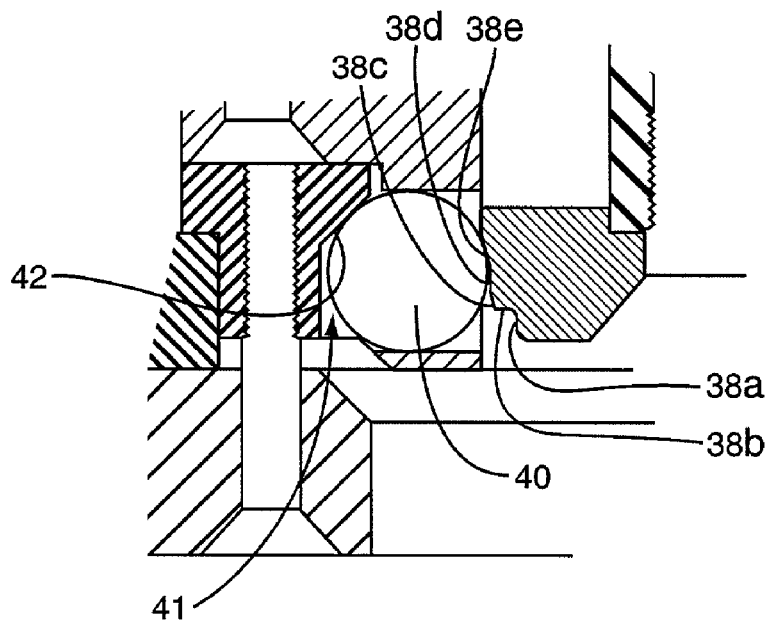

FIG. 3D depicts the operation of a failsafe surface 38d, interposed between the initial actuating surface 38c and the tapered locking surface 38e. The failsafe surface 38d is generally parallel to the longitudinal axis of the piston 32. In the event that a positive, downwardly-directed force acting on piston 32 (for example, via pneumatic pressure, hydraulic pressure, electromechanical actuation, or the like) fails, the force on the rolling member 40, which is maintained in compression when the tool plate 14 is actively locked to the master plate 12, will, by actuation of the tapered locking surface 38e, tend to urge the piston 32 upwardly. As shown in FIG. 3D, this upward motion of the piston 32 will terminate at the point at which the rolling member 40 comes into contact with the failsafe surface 38d. Since the failsafe surface 38d is generally parallel to the longitudinal axis of the piston 32, the normal force directed against it by the rolling member 40 can produce no force component in the axial direction. Thus, the master plate 12 and tool plate 14 will remain locked together, until an active force moves the piston 32 in an upward direction, allowing the rolling member 40 to translate inwardly towards the axis of piston 32.

The rolling member 40 may be a sphere, such as for example a steel ball, or alternatively it may be a cylinder oriented on its side and operative to roll in a generally radial direction with respect to the axis of piston 32. Correspondingly, the piston 32 and rolling member retention chamber 41 may be generally circular with ball-shaped rolling members 40 oriented around the periphery thereof. Alternatively, the piston 32 and retention chamber 41 may assume a polygonal shape, with cylinder-shaped rolling members oriented along each face of the polygon. In either case, the interaction of the multi-faceted contact surface 38 of the piston 32 with the rolling members 40—as depicted in section views in FIGS. 3A-3D—is the same.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A robotic tool coupling piston moveable along a longitudinal axis, comprising:
   a tapered locking surface;
   an initial actuating surface having an angle with respect to said axis not greater than the angle of said tapered locking surface; and
   a failsafe surface interposed between said tapered locking surface and said initial actuating surface.

2. The piston of claim 1 wherein said failsafe surface is generally parallel to said axis.

3. The piston of claim 1 wherein said initial actuating surface is generally parallel to said axis.

4. The piston of claim 1 wherein said tapered locking surface increases outwardly in an axial direction away from said failsafe surface.

5. The piston of claim 1 further comprising a step surface.

6. The piston of claim 5 wherein said step surface abuts said initial actuating surface.

7. The piston of claim 6 wherein said step surface extends generally normal to said axis.

8. The piston of claim 7 wherein said initial actuating surface is parallel to said axis, and wherein said step surface and said initial actuating surface form a generally 90-degree edge.

9. The piston of claim 8 wherein said edge is chamfered.

10. The piston of claim 8 wherein said edge is rounded.

11. The piston of claim 5 further comprising a retention surface.

12. The piston of claim 11 wherein said retention surface abuts said step surface.

13. The piston of claim 12 wherein said step surface extends outwardly from said retention surface to said initial actuating surface.

14. The piston of claim 11 wherein said retention surface is generally parallel to said axis.

15. A robotic tool connecting system, comprising:
   a first robotic tool connecting unit, having a plurality of rolling members disposed in a retention chamber, and including a piston selectively movable along a longitudinal axis, said piston including a multifaceted contact surface comprising:
   i) a tapered locking surface disposal at an angle with respect to said axis;
   ii) an initial actuating surface having an angle with respect to said axis not greater than the angle of said tapered locking surface; and
   iii) a failsafe surface interposed between said tapered locking surface and said initial actuating surface; and
   a second robotic tool connecting unit including at least one angled surface operative to lock said first and second units together when said rolling members are forced against said angled surface by said tapered locking surface.

16. The system of claim 15 wherein said rolling members are disposed generally circumferentially around said axis.

17. The system of claim 16 wherein said rolling members are operative to roll in a generally radial direction.

18. The system of claim 16 wherein said rolling members comprise balls.

19. The system of claim 16 wherein said rolling members comprise cylinders.

20. The system of claim 15 wherein said failsafe surface is generally parallel to said axis.

21. The system of claim 20 wherein no component of force exerted by said rolling members on said failsafe surface is operative to retract said piston from said second robotic tool connecting unit.

22. The system of claim 15 wherein said initial actuating surface is parallel to said axis.

23. The system of claim 15 wherein said multifaceted contact surface further comprises a step surface extending generally normal to said axis and abutting said initial actuating surface.

24. The system of claim 23 wherein said initial actuating surface is parallel to said axis, and wherein said step surface and said initial actuating surface form a generally 90-degree edge.

25. The system of claim 23 further comprising a retention surface abutting said step surface inwardly of said initial actuating surface, said retention surface operative to retain said rolling members within said retention chamber.

26. The system of claim 25 wherein said retention surface is generally parallel to said axis.

27. A robotic tool coupler comprising:
a first connecting unit;
a second connecting unit;
a piston associated with the first connecting unit and adapted to engage at least one locking member associated with the first connecting unit and urge the locking member into a locked position against an angled surface associated with the second connecting unit, resulting in the first connecting unit being coupled to the second connecting unit;
the piston movable back and forth along an axis between an unlocked position and a locked position and including an outer surface, and wherein at least portions of the outer surface contact and engage the locking member as the piston moves from the unlocked position to the locked position;
wherein the outer surface of the piston includes at least three distinct surface areas including a step surface, a tapered locking surface spaced from the step surface and operative to engage said locking member when the piston assumes the locked position and maintain the locking member in the locked position, and a contact surface disposed between the step surface and the tapered locking surface and operative to contact the locking member prior to the tapered locking surface contacting the locking the member as the piston moves from the unlocked position to the locked position; and
wherein the intermediate contact surface is disposed at an angle equal to or less than the angle of the tapered locking surface wherein the angles are measured relative to the axis of the piston.

28. The robotic tool coupler of claim 27 wherein the angle of the tapered locking surface, relative to the axis of the piston, ranges from approximately 5° to approximately 30° and the angle of the contact surface, relative to the axis of the piston, ranges from approximately 5° to approximately 30°.

29. The robotic tool coupler of claim 27 wherein the intermediate contact surface is disposed at an angle of approximately 0° with respect to the axis of the piston and wherein the tapered locking surface is disposed at an angle of at least 5° with respect to the axis of the piston.

30. The robotic tool coupler of claim 27 wherein the step surface is formed on an end portion of the piston.

31. The robotic tool coupler of claim 27 wherein the step surface includes a surface that extends inwardly towards the axis of the piston and at an angle generally perpendicular to the arm of the piston.

32. The robotic tool coupler of claim 31 wherein the intermediate contact surface connects with the step surface and extends therefrom towards the tapered locking surface.

33. The robotic tool coupler of claim 27 wherein the outer surface of the piston includes a failsafe surface disposed between the intermediate contact surface and the tapered locking surface.

\* \* \* \* \*